United States Patent Office 3,833,642
Patented Sept. 3, 1974

3,833,642
ALKENYLOXY BENZOIC ACID AND
ESTERS THEREOF
Madhukar Subraya Chodnekar, Basel, Albert Pfiffner and
Norbert Rigassi, Arlesheim, Ulrich Schwieter, Reinach,
Basel-Land, and Milos Suchy, Basel, Switzerland, assignors to Hoffmann-La Roche Inc., Nutley, N.J.
No Drawing. Filed Apr. 23, 1970, Ser. No. 31,422
Claims priority, application Switzerland, May 30, 1969,
6,597/69
The portion of the term of the patent subsequent to
Oct. 30, 1990, has been disclaimed
Int. Cl. C07c 69/78
U.S. Cl. 260—473 R    20 Claims

ABSTRACT OF THE DISCLOSURE

Phenyl ethers, thioethers or sulfoxides of alkyl or alkenyl derivatives having a chain length of at least 6 carbon atoms and wherein the ring of the benzyl or phenyl moiety is substituted with carboxyl or esters thereof which are useful in killing and preventing proliferation of insects by upsetting their hormone balance.

SUMMARY OF THE INVENTION

In accordance with this invention it has been found that compounds of the formula

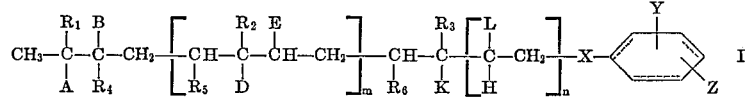  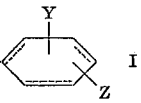 I wherein $R_1$ is methyl or ethyl; $R_2$ and $R_3$ are hydrogen, methyl or ethyl; $R_4$ is hydrogen or methyl; $R_5$ and $R_6$ are lower alkyl or hydrogen; D, E, K and L are individually hydrogen; A taken together with B form a carbon-to-carbon bond, an oxygen bridge or a sulfur bridge; D taken together with E and K taken together with L form a carbon-to-carbon bond; X is oxy, thio or sulfinyl, Y is hydrogen, halogen, lower alkyl or lower alkoxy; Z is carboxyl, lower alkoxycarbonyl, aryloxycarbonyl or arloweralkoxycarbonyl; $m$ and $n$ are both 0, $m$ and $n$ are both 1 or $m$ is 1 and $n$ is 0; and the dotted bonds can be optionally hydrogenated upset the hormone balance of pests such as insects to prevent them from growing and reproducing.

In accordance with this invention the compound of formula I is prepared by reacting a compound of the formula

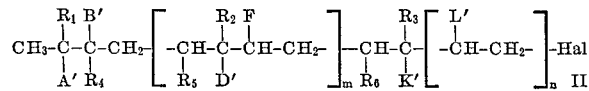 II wherein $R_1$, $R_2$, $R_3$, $R_4$, $R_5$, $R_6$ and $m$ and $n$ are as above; D', E, K' and L' are hydrogen; A' taken together with B' is a carbon-to-carbon bond, an oxygen bridge or a sulfur bridge; D' taken together with E, and K' taken together with L' form a carbon-to-carbon bond; and Hal is a halogen with a compound of the formula:

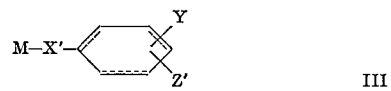 III wherein M is a metal of Group I in the periodic table; X' is —O—, —O—CH₂— or —S—; Y is as above; Z' is formyl, carboxyl, lower alkoxycarbonyl, aryloxycarbonyl or aralkoxycarbonyl; and the dotted lines can be optionally hydrogenated and thereafter oxidizing the aldehyde; and if desired, one can esterify the thus-obtained acid. Furthermore, the terminal double bond in the compound of formula I can be epoxidized or episulfidized.

DETAILED DESCRIPTION OF THE INVENTION

The term "halogen" as used throughout this application, includes all four halogens, i.e., bromine, chlorine, fluorine, and iodine, with chlorine being preferred. As used throughout this application, the term "lower alkyl" comprehends both straight and branched chain saturated hydrocarbon groups containing from 1 to 6 carbon atoms, such as methyl, ethyl, propyl, isopropyl, pentyl and hexyl. The term "lower alkoxy" comprehends lower alkoxy groups containing from 1 to 6 carbon atoms such as methoxy, propoxy, ethoxy, etc.

The term "aryl" as used throughout the application includes mono-nuclear aryl groups such as phenyl which can be unsubstituted or substituted in 1 or more positions with a hydroxy, methylenedioxy, halogen, nitro, lower alkyl or a lower alkoxy substituent, and polynuclear aryl groups such as naphthyl, anthryl, phenanthryl, azulyl, etc. which may be substituted with 1 or more of the aforementioned groups. The term "aryloxycarbonyl" comprehends aryloxycarbonyl groups wherein the aryl moiety is defined as above. The preferred aryloxycarbonyl group is phenoxycarbonyl. The term "aralkyloxycarbonyl" comprehends aralkoxycarbonyl groups wherein aryl is defined as above and the alkyl is lower alkyl. The preferred aralkoxycarbonyl group is benzyloxycarbonyl.

The term "alkoxycarbonyl" as utilized herein includes lower alkoxycarbonyl groups wherein lower alkoxy is defined as above. Among the preferred lower alkoxycarbonyl groups are included methoxycarbonyl, ethoxycarbonyl and isopropoxycarbonyl.

The compounds of formula I are useful in the control of pests such as Tineola biselliella (clothes moth), Ephestia kuhniella (meal moth), Dysdercus cingulatus (cotton bug) and Blatella germanica (cockroach).

In contrast to most of the known pest-control agents which kill, disable or repell the pests by acting as contact poisons and feed poisons, the compounds of formula I above prevent maturation and proliferation of these pests by interfering with their hormonal system. In insects, for example, the formation into the imago, the laying of viable eggs and the development of laid normal eggs is disturbed. Furthermore, the sequence of generations is interrupted and the insects are indirectly killed.

The compounds of formula I above are practically nontoxic to vertebrates. The toxicity of these compounds is greater than 1000 mg./kg. body weight. Moreover, these compounds are readily degraded and the risk of accumulation is therefore excluded. Therefore, these compounds can be used without fear of danger in the control of pests in animals, plants, foods and textiles.

Generally, in controlling invertebrate animals, the compounds of formula I above thereof are applied to the material to be protected, e.g., foodstuffs, feeds, textiles, plants in concentrations of from about $10^{-3}$ to $10^{-8}$ gm./cm.$^2$ of the material to be protected. Generally, it is preferred to utilize the compounds of formula I above in a composition with a suitable inert carrier. Any conventional inert carrier can be utilized.

The compound of formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compound of formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; or chlorinated hydrocarbons such as tetrachloroethylene, tetrachlorobenzene and the like. The compounds of formula I above can also be prepared in forms suitable for dilution with water to form aqueous liquids such as, for example, emulsion concentrates, pastes or powders. The compounds of formula I above can be combined with solid carriers for making dusting or strewing powders as, for example, talc, kaolin, bentonite, calcium carbonate, calcium phosphate, etc. The compositions containing the compound of formula I above can contain, if desired, emulsifiers, dispersing agents, wetting agents, or other active substances such as fungicides, bacteriacides, nematocides, fertilizers and the like. These materials which are to be protected act as bait for the insect. In this manner, the insect, by contacting the material impregnated with the compound of formula I above, also contacts the compound of formula I above.

It will be appreciated from the foregoing that the invention also includes within its scope an agent useful for the control of pests which contains as an essential active ingredient or essential active ingredients one or more of the phenyl derivatives of formula I in association with a compatible carrier material. In addition, the invention includes within its scope a method of rendering a locus subject to or subjected to attack by pests immune to or free from such attack, said method comprising applying to said locus an agent as hereinbefore defined or one or more of the phenyl derivatives of formula I.

Among the phenyl derivatives which are included within formula I are the following:

(a) derivatives of the general formula:

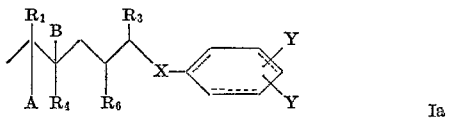

wherein $R_1$, $R_3$, $R_4$, $R_6$, A, B, X, Y and Z are as above; and the dotted bonds can be hydrogenated, which are prepared by reacting a compound of the formula

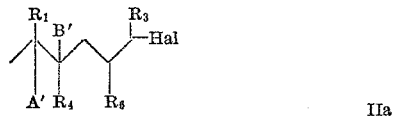

wherein A', B', $R_1$, $R_3$, $R_4$ and $R_6$ are as above and Hal is a halogen with a compound of formula III and oxidizing the aldehyde group and, if desired, esterifying the resulting acid. The terminal double bond can be epoxidized or episulfidized;

(b) derivatives of the formula

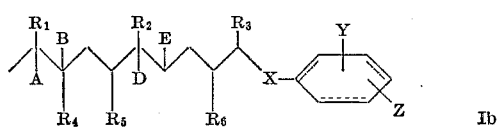

wherein A, B, D, E, $R_1$, $R_2$, $R_3$, $R_4$, $R_5$, $R_6$, X, Y and Z are as above and the dotted bonds can optionally be hydrogenated which are prepared by reacting compounds of the formula

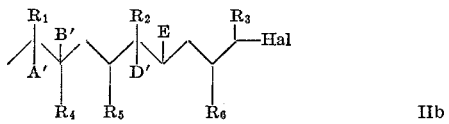

wherein A', B', D', E, $R_1$, $R_2$, $R_3$, $R_4$, $R_5$, $R_6$ and Hal are as above with a compound of formula III and oxidizing the aldehyde group and, if desired, esterifying the resulting acid. The terminal double bonds can be epoxidized or episulfidized (c) derivatives of the formula

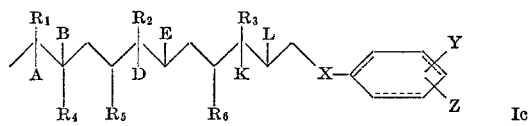

wherein $R_1$, $R_2$, $R_3$, $R_4$, $R_5$, $R_6$, A, B, E, D, L, K, Y, X and Z are as above and the dotted bonds can be optionally hydrogenated, which are prepared by reacting a halide of the formula

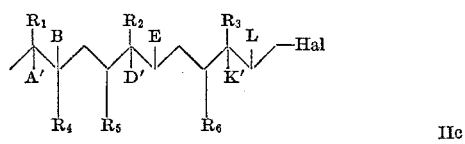

wherein $R_1$, $R_2$, $R_3$, $R_4$, $R_5$, $R_6$, A', B', D', E, K' and L are as above with a compound of formula III and oxidizing the aldehyde group and, if desired, esterifying the resulting acid. The terminal double bonds can be epoxidized or episulfidized.

Among the preferred compounds of formulas Ia, Ib and Ic are those where the dotted bonds are carbon-to-carbon bonds.

Among the preferred compounds of formula I are the following:

p-[(4,5-epoxy-1,5-dimethyl-heptyl)-oxy]-benzoic acid methyl ester;
p-[(2-ethyl-5-methyl-hex-4-enyl)-oxy]-benzoic acid methyl ester;
p-[(1,5,9-trimethyl-undeca-4,8-dienyl)-oxy]-benzoic acid methyl ester.
p-[(1,5-dimethyl-hex-4-enyl)-oxy]-benzoic acid methyl ester;
p-[(1,5-dimethyl-hex-4-enyl)-oxy]-benzoic acid;
p-[(4,5-epoxy-1,5-dimethyl-hexyl)-oxy]-benzoic acid methyl ester;
p-[(1,4,5-trimethyl-hex-4-enyl)-oxy]-benzoic acid methyl ester;
p-[(4,5-epoxy-1,4,5-trimethyl-hexyl)-oxy]benzoic acid methyl ester;
p-[(1-ethyl-5-methyl-hept-4-enyl)-oxy]benzoic acid methyl ester;
p-[(4,5-epoxy-1-ethyl-5-methyl-heptyl)-oxy]-benzoic acid methyl ester;
p-[(3,7,11-trimethyl-dodeca-2,6,10-trienyl)-oxy]-benzoic acid methyl ester;
p-[(3,7,11-trimethyl-dodeca-2,6,10-trienyl)-oxy]-benzoic acid;
p-[(10,11-epoxy-3,7,11-trimethyl-dodeca-2,6-dienyl)-oxy]-benzoic acid methyl ester; and
p-[(1,5-dimethyl-hept-4-enyl)-oxy]benzoic acid methyl ester.

Among the preferred compounds of formula Ia are included compounds of the formula

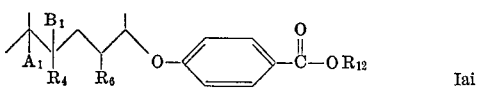
Iai wherein $A_1$ and $B_1$ are a carbon-to-carbon bond or oxygen bridge and $R_{12}$ is hydrogen or lower alkyl, preferably methyl, and $R_4$ and $R_6$ are as above;

Among the preferred compounds of formula Ib are compounds of the formula

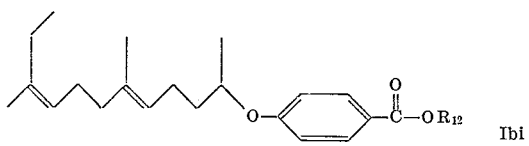
Ibi wherein $R_{12}$ is hydrogen or lower alkyl, preferably methyl.

Among the preferred derivatives of formula Ic are included compounds of the formula

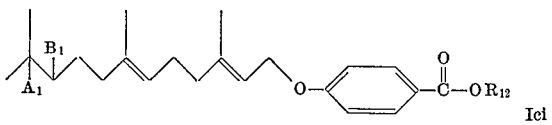
Ici wherein $A_1$ and $B_1$ are as above and $R_{12}$ is hydrogen or lower alkyl, preferably methyl.

Another preferred compound of formula I is a compound having the formula

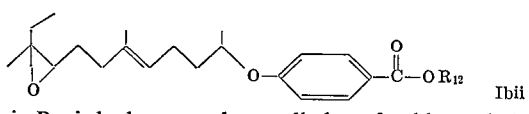
Ibii wherein $R_{12}$ is hydrogen or lower alkyl, preferably methyl.

The halide starting materials of formula II and the starting materials of formula III are known substances and they can be reacted with each other to produce a compound of the formula I above in accordance with methods known per se.

For example, a halide of formula II preferably a chloride or bromide, is expediently dissolved in an inert organic solvent and the solution allowed to act on a compound of formula III (formed in statu nascendi). The compound of formula III (an alkali metal salt) can advantageously be formed by reacting the corresponding phenol, alcohol, thiophenol or thioalcohol with an alkali metal hydride, alkali metal alcoholate or alkali metal hydroxide, preferaby sodium hydride, a sodium alcoholate or sodium hydroxide in a known manner. The salt formation and the reaction of the salt with the halide are expediently carried out in the presence of a suitable inert organic solvent. When sodium hydride is used, suitable solvents are, for example, dioxane, tetrahydrofuran, dimethylformamide or diethyl ether, when sodium methylate is used a suitable solvent is for example, methanol or when sodium hydroxide is used suitable solvents are for example, methanol, ethanol or acetone. The reaction of the halide with a phenol, alcohol, thiophenol or thioalcohol can also be carried out in the presence of a carbonate, preferably potassium carbonate.

The reaction of a halide of formula II with a compound of formula III is expediently carried out at a temperature between 0° C. and the boiling temperature of the reaction mixture, advantageously in the presence of hexamethyl phosphoric acid triamide. The reaction mixture can be worked up in a conventional manner. For example, it can be poured onto ice and extracted with diethyl ether, the ether extract washed with water, dried and evaporated. The resulting derivative of formula I can be purified by adsorption; for example, on Kieselgel or aluminum oxide.

When $Z'$, in the compound of formula I above is formyl, this compound can be oxidized to the corresponding acid in a known manner.

The oxidation of the formyl group can advantageously be carried out at room temperature with the aid of silver oxide formed in an aqueous medium from silver nitrate and sodium hydroxide. After the oxidation, the aqueous solution is extracted with diethyl ether and the ether extract is discarded. By acidification of the aqueous phase, the sodium salt present therein is converted into the free acid which can be extracted (e.g., with diethyl ether or methylene chloride) and isolated from the extract in a conventional manner.

When Z, in the compound of formula I above is an acid group, the acid can be converted into an acid chloride by conventional means such as by treatment with thionyl chloride, preferably in the presence of pyridine. The acid halide can be transformed into an ester by reaction with an alcohol utilizing conventional procedures well known in the art.

If desired, the derivatives of formula I in which A and B taken together form a carbon-to-carbon bond, can be epoxidized or episulfidized in accordance with methods known per se.

Thioethers obtained can be oxidized to the corresponding sulfinyl or sulfonyl derivatives by oxidation. Particularly suitable oxidizing agents are organic peracids, preferably m-chloroperbenzoic acid. The oxidation is advantageously carried out in an inert organic solvent, especially in methylene chloride, at a temperature between 0° C. and room temperature. If 1 mole of peracid is used for each mole of thioether, the corresponding sulfinyl derivative is obtained. If 2 moles of peracid are used for each mole of thioether, the corresponding sulfonyl derivative is obtained.

The epoxidation of derivatives of formula I can expediently be carried out by dissolving the derivative concerned in an inert solvent (especially in a halogenated hydrocarbon such as methylene chloride or chloroform) and treating the solution obtained with an organic peracid (e.g., with perbenzoic acid, m-chloroperbenzoic acid or perphthalic acid) at a temperature between 0° C. and room temperature. Alternatively, the derivative concerned can be suspended in water and treated with an appropriate amount of an inert solvent (e.g., with dioxane, tetrahydrofuran or 1,2-dimethoxyethane) such that a homogenous concentrated solution is obtained. N-Bromosuccinimide is then introduced portionwise into this solution at a temperature between 0° C. and room temperature. The resulting bromohydrin can be smoothly converted into the desired epoxide by the action of alkali, especially by the action of sodium methylate in methanol.

The introduction of a sulfur bridge into derivatives of formula I can be effected in various ways. If, for example, thiourea is allowed to act on a halohydrin (preferably on the bromohydrin) of a derivative for formula I there is firstly formed an isothiouronium salt. This salt is also formed when thiourea is allowed to act on an epoxide of formula I, at a temperature of from 0 to 30° C. in the presence of a mineral acid. The isothiouronium salts obtained can be readily converted into the desired epithio derivatives of formula I by treatment with a base.

Insofar as the side chain is unsaturated, the derivatives of formula I are obtained according to the process as a cis/trans isomer mixture. The mixture can, for example, be separated into the individual isomeric forms by adsorption on a material having selective activity. For example, the isomer mixture can be dissolved in an inert organic solvent (e.g., in hexane, ether or acetic acid ethyl ether) and adsorbed on Kieselgel. The isomers adsorbed in different zones can be eluted with one of the solvents named hereinbefore or a mixture thereof and isolated. In individual cases, the isomer mixture can also be separated by fractional distillation or by fractional crystallization.

The following examples are illustrative but not limitative of this invention. In the examples, the suspension of the hydride mineral oil is percent by weight. The ether utilized in these examples was diethyl ether. The petroleum ether utilized in these examples has a boiling point of from 40° C. to 45° C. The 2% sodium bisulfite utilized in Example 3 was an aqueous solution containing 2% sodium bisulfite.

Example 1

In an inert gas atmosphere, 8.4 g. of a 50% by weight suspension of sodium hydride in mineral oil are washed with two 50 ml. portions of tetrahydrofuran, then introduced into 100 ml. of tetrahydrofuran and treated dropwise with a solution of 47 g. of p-hydroxy-benzoic acid methyl ester in 200 ml. of tetrahydrofuran. 37.7 g. of 2-bromo - 5,6 - dimethyl - hept - 5 - ene in 80 ml. of hexamethylphosphoric triamide are subsequently added dropwise and the resulting mixture is heated under reflux conditions for 2 hours, cooled, poured onto ice and exhaustively extracted with diethyl ether. The ether extract is washed with water, dried over sodium sulfate and evaporated under reduced pressure. The residual oily p-[(1,4,5-trimethyl - hex - 4 - enyl) - oxy] - benzoic acid methyl ester can be purified by adsorption on Kieselgel; boiling point=160°–165° C./0.1 mm. Hg.

Example 2

In the manner of Example 1:
2 - bromo - 6 - methyl - hept - 5 - ene was reacted with p - hydroxy - benzoic acid methyl ester to produce p-[(1,5 - dimethyl - hex - 4 - enyl) - oxy] - benzoic acid methyl ester (boiling point=158°–160° C./0.1 mm. Hg.);
3 - bromo - 7 - methyl - non - 6 - ene was reacted with p - hydroxy - benzoic acid methyl ester to produce p-[(1 - ethyl - 5 - methyl - hept - 4 - enyl) - oxy] - benzoic acid methyl ester (boiling point=182°–185° C./0.1 mm. Hg);
2 - bromo - 6 - methyl - oct - 5 - ene was reacted with p - hydroxy - benzoic acid methyl ester to produce p-[(1,5 - dimethyl - hept - 4 - enyl) - oxy] - benzoic acid methyl ester and
3 - bromomethyl - 6 - methyl - hept - 5 - ene was reacted with p - hydroxy - benzoic acid methyl ester to produce p - [(2 - ethyl - 5 - methyl - hex - 4 - enyl)] - benzoic acid methyl ester (boiling point= 175°–177° C./0.1 mm. Hg).

Example 3

A solution of 2 g. of p - [(1,5 - dimethyl - hex - 4-enyl)-oxy]-benzoic acid methyl ester in 150 ml. of methylene chloride is treated dropwise at 0° C. with a solution of 1.57 g. of 80% by weight of m-chloro-perbenzoic acid in 100 ml. of methylene chloride. After 15 minutes, the resulting mixture is successively washed with an aqueous solution containing 2% sodium bisulfite solution, 5% by weight of aqueous sodium bicarbonate solution and water, dried over sodium sulfate and evaporated under reduced pressure. The residual p-[(4,5-epoxy-1,5-dimethylhexyl)-oxy]-benzoic acid methyl ester can be purified by adsorption on Kieselgel; $n_D^{28}$=1.5058.

Example 4

In the manner of Example 3:
p - [(1,4,5 - trimethyl - hex - 4 - enyl) - oxy] - benzoic acid methyl ester was converted to p - [(4,5 - epoxy-1,4,5 - trimethyl - hexyl) - oxy] - benzoic acid methyl ester ($n_D^{28}$=1.5071);
p - [(1 - ethyl - 5 - methyl - hept - 5 - enyl) - oxy]-benzoic acid methyl ester was converted to p - [(4,5-epoxy - 1 - ethyl - 5 - methyl - heptyl) - oxy] - benzoic acid methyl ester ($n_D^{24}$=1.5192); and
p - [(1,5 - dimethyl - hept - 4 - enyl) - oxy] - benzoic acid methyl ester was converted to p - [(4,5 - epoxy - 1,5-dimethyl-heptyl)-oxy]-benzoic acid methyl ester.

Example 5

In an inert gas atmosphere, 15 g. of a 50% by weight suspension of sodium hydride in mineral oil are washed with two 50 ml. portions of tetrahydrofuran, then introduced into 150 ml. of tetrahydrofuran and treated dropwise with a solution of 48 g. of p-hydroxy-benzoic acid methyl ester in 200 ml. of tetrahydrofuran. 81 g. of 2-bromo - 6,10 - dimethyl - dodeca - 5,9 - diene in 120 ml. of hexamethylphosphoric triamide are subsequently added dropwise over a period of 30 minutes and the resulting mixture is heated under reflux conditions for 6 hours, stirred at room temperature for 20 hours, poured onto ice and exhaustively extracted with diethyl ether. The extract is dried over sodium sulfate and evaporated. The residual p - [(1,5,9 - trimethyl - undeca - 4,8 - dienyl) - oxy]-benzoic acid methyl ester can be purified by adsorption on Kieselgel; boiling point=230° C./0.1 mm. Hg.; $n_D^{24}$=1.4928.

Example 6

In an inert gas atmosphere, 4.8 g. of a 50% by weight suspension of sodium hydride in mineral oil are washed with two 25 ml. portions of tetrahydrofuran, then introduced into 50 ml. of tetrahydrofuran and treated dropwise with a solution of 14.9 g. of p-hydroxy-benzoic acid methyl ester in 100 ml. of tetrahydrofuran. 28.6 g. of 1-bromo-3,7,11-trimethyl-dodeca-2,6,10-triene in 40 ml. of hexamethylphosphoric triamide are subsequently added dropwise and the resulting mixture is heated under reflux conditions for 2 hours, cooled, poured onto ice and exhaustively extracted with diethyl ether. The ether extract is washed with water, dried over sodium sulfate and evaporated under reduced pressure. The residual p-[(3,7,11-trimethyl - dodeca-2,6,10-trienyl)-oxy]-benzoic acid methyl ester can be purified by adsorption on Kieselgel; $n_D^{24}$=1.5269.

Example 7

A solution of 2 g. of p-[(3,7,11-trimethyl-dodeca-2,6,10-trienyl)-oxy]-benzoic acid methyl ester in 150 ml. of methylene chloride is treated dropwise at 0° C. with a solution of 1.2 g. of 80% by weight of m-chloro-perbenzoic acid in 100 ml. of methylene chloride. After 15 minutes, the resulting mixture is successively washed with 2% by weight aqueous sodium sulfite solution, 5% by weight aqueous sodium bicarbonate solution and water, dried over sodium sulfate and evaporated under reduced pressure. The residual p-[(10,11-epoxy-3,7,11-trimethyl-dodeca-2,6-dienyl)-oxy]-benzoic acid methyl ester can be purified by adsorption on aluminum oxide; $n_D^{24}$=1.5160.

Example 8

7.2 g. of p-[(1,5-dimethyl-hex-4-enyl)-oxy]-benzoic acid methyl ester are dissolved in 30 ml. of 2-N aqueous sodium hydroxide solution, diluted with 50 ml. of a methanol water mixture containing 50% by volume of methanol and 50% by volume of water, heated under reflux for 1.5 hours, cooled, treated with 200 ml. of water and exhaustively extracted with diethyl ether. The ether extract is dried over sodium sulfate and evaporated under reduced pressure. The residual p-[(1,5-dimethyl-hex-4-enyl)-oxy]-benzoic acid can be purified by crystallization from benzene; melting point=57°–59° C.

Example 9

In a manner of Example 8 p-[(3,7,11-trimethyl-dodeca-2,6,10-trienyl)-oxy]-benzoic acid methyl ester is converted to p-[(3,7,11 - trimethyl - dodeca-2,6,10-trienyl)-oxy]-benzoic acid (melting point=80°–81° C).

Examples 10 to 12

In Examples 10 through 12 which relate to tests demonstrating the activity of the phenyl derivatives provided by the invention, the various phenyl derivatives are referred to by way of the letters indicated in the following list:

(A) p-[1,5-dimethyl-hex-4-enyl)oxy]-benzoic acid methyl ester
(B) p-[(4,5-epoxy-1,5-dimethyl-hexyl)-oxy]-benzoic acid methyl ester
(C) p-[(1,4,5-trimethyl-hex-4-enyl)-oxy]-benzoic acid methyl ester
(D) p-[(4,5-epoxy-1-ethyl-5-methyl-heptyl)-oxy]-benzoic acid methyl ester
(E) p-[(2-ethyl-5-methyl-hex-4-enyl)-oxy]-benzoic acid methyl ester
(F) p-[(4,5-epoxy-1,4,5-trimethyl-hexyl)-oxy]-benzoic acid methyl ester
(G) p-[(3,7,11-trimethyl-dodeca-2,6,10-trienyl)-oxy]-benzoic acid methyl ester.

Example 10

A cotton disc (10 cm.$^2$) is sprayed with a solution of active substance in acetone. After drying, 30–36 freshly laid eggs of the meal moth (*Ephestia kuhniella*) are placed on the disc. The same is done with an untreated cotton disc and a cotton disc sprayed only with acetone. The discs are placed in a cage and kept at 25° C. and 90% relative humidity. The development of the eggs is registered over a period of a few days and the results are evaluated (100% egg mortality: no development of the embryos in the eggs laid on discs soaked with active substance).

RESULTS

| Active substance | Amout of active substance (g./cm.$^2$) | Number of eggs | Number of larvae | Mortality (percent) |
|---|---|---|---|---|
| A | $10^{-4}$ | 31 | 0 | 100 |
|   | $10^{-5}$ | 27 | 0 | 100 |
| B | $10^{-4}$ | 28 | 0 | 100 |
|   | $10^{-5}$ | 18 | 0 | 100 |
| C | $10^{-4}$ | 33 | 0 | 100 |
|   | $10^{-5}$ | 50 | 5 | 90 |
| D | $10^{-4}$ | 46 | 4 | 91 |
|   | $10^{-5}$ | 47 | 11 | 77 |
| E | $10^{-4}$ | 44 | 0 | 100 |
|   | $10^{-5}$ | 52 | 0 | 100 |
|   | $10^{-6}$ | 33 | 18 | 45 |
| Control with acetone | | 50 | 50 | 0 |
| Control without acetone | | 49 | 46 | 6 |

Example 11

A disc of woolen material (10 cm.$^2$) is sprayed with a solution of active substance in acetone and, together with an untreated disc of woolen material and a disc of woolen material treated only with acetone, hung in a cage occupied by 20 young clothes moths (*Tineola biselliella*). The development of the eggs laid at 25° C. is registered over a period of 4 days and the results are evaluated (100% sterilant activity: larvae hatch from none of the eggs laid on treated and untreated discs of woolen material; 100% ovicidal activity: larvae hatch from none of the eggs laid on treated discs of woolen material).

RESULTS

| Active substance | Amount of active substance (g./cm.$^2$) | Sterilant activity (percent) | Ovicidal activity (percent) |
|---|---|---|---|
| D | $10^{-3}$ | 100 | 46 |
|   | $10^{-5}$ | 69 | 0 |
| Control with acetone | | 0 | 0 |
| Control without acetone | | 0 | 0 |

Example 12

A filter-paper strip (90 cm.$^2$) is sprayed with a solution of active substance in acetone. After drying, 3-4 pairs of freshly moulted imagos of the cotton bug (*Dystercus cingulatus*) are placed on the strip. The same is done with an untreated filter-paper strip and a filter-paper strip treated only with acetone. The development of the eggs laid daily is noted and the results are evaluated (100% egg mortality: no development of the embryos in the eggs laid on filter-paper strips soaked with active substance).

RESULTS

| Active substance | Amount of active substance (g./cm.$^2$) | Number of eggs | Number of larvae | Mortality (percent) |
|---|---|---|---|---|
| A | $10^{-5}$ | 370 | 0 | 100 |
| B | $10^{-5}$ | 390 | 0 | 100 |
| C | $10^{-5}$ | 145 | 0 | 100 |
| D | $10^{-5}$ | 250 | 0 | 100 |
| F | $10^{-5}$ | 285 | 15 | 95 |
| G | $10^{-5}$ | 190 | 1 | 99 |
|   | $10^{-3}$ | 312 | 124 | 40 |
| Control with acetone | | 270 | 262 | 3 |
| Control without acetone | | 410 | 390 | 5 |

We claim:

1. A compound of the formula:

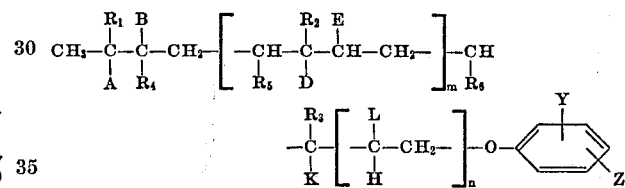

wherein $R_1$ is methyl or ethyl; $R_2$ and $R_3$ are hydrogen, methyl or ethyl; $R_4$ is hydrogen or methyl; $R_5$ and $R_6$ are lower alkyl or hydrogen; D, E, K and L are individually hydrogen; A taken together with B form a carbon-to-carbon bond; D taken together with E and K taken together with L form a carbon-to-carbon bond; Y is hydrogen, halogen, lower alkyl or lower alkoxy; Z is carboxyl, lower alkoxycarbonyl, aryloxycarbonyl or arlower-alkoxycarbonyl; and m and n are both 0, m and n are both 1 or m is 1 and n is 0;

2. The compound of claim 1 having the formula:

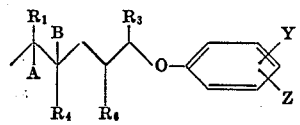

wherein $R_1$, $R_3$, $R_4$, $R_6$, A, B, Y and Z are as above.

3. The compound of claim 2 having the formula:

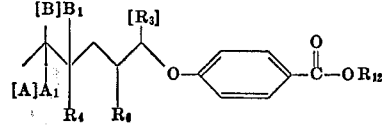

wherein $R_3$, $R_4$ and $R_6$ are as above; $A_1$ and $B_1$ taken together form a carbon to carbon double bond; and $R_{12}$ is hydrogen or lower alkyl.

4. The compound of claim 1 having the formula:

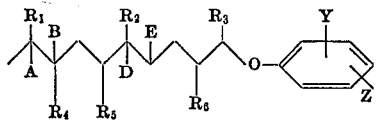

wherein $R_1$, $R_2$, $R_3$, $R_4$, $R_5$, $R_6$, A, B, D, E, Y and Z are as above.

5. The compound of claim 1 having the formula:

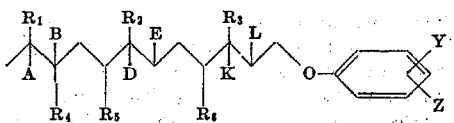

wherein A, B, D, E, L, K, Y, Z, $R_1$, $R_2$, $R_3$, $R_4$, $R_5$ and $R_6$ are as above.

6. The compound of claim 3 wherein $R_{12}$ is hydrogen.

7. The compound of claim 6 wherein said compound is p-[(1,5-dimethyl-hex-4-enyl)-oxy]-benzoic acid.

8. The compound of claim 3 wherein $R_{12}$ is lower alkyl and $R_6$ and $R_4$ are hydrogen.

9. The compound of claim 8 wherein said compound is p-[(1,5-dimethyl-hex-4-enyl)-oxy]-benzoic acid methyl ester.

10. The compound of claim 3 wherein $R_4$, and $R_{12}$ are methyl.

11. The compound of claim 10 wherein said compound is p-[(1,4,5-trimethyl-hex-4-enyl)-oxy] - benzoic acid methyl ester.

12. The compound of claim 3 wherein $R_6$ is ethyl and $R_{12}$ is methyl.

is p-[(2-ethyl - 5 - methyl-hex-4-enyl)-oxy]-benzoic acid is p-[(2-ethyl - 5 - methyl-hex-4-enyl)oxy]-benzoic acid methyl ester.

14. The compound of claim 2 wherein said compound is p-[(1-ethyl-5-methyl-hept-4-enyl)-oxy]-benzoic acid methyl ester.

15. The compound of claim 4 wherein said compound has the formula

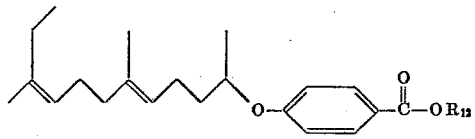

wherein $R_{12}$ is hydrogen or lower alkyl.

16. The compound of claim 15 wherein said compound is p-[(1,5,9-trimethyl-undeca - 4,8 - dienyl)oxy]-benzoic acid methyl ester.

17. The compound of claim 4 wherein said compound has the formula

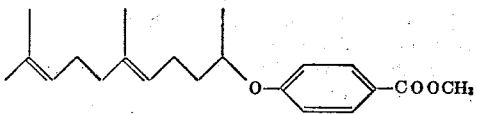

18. A compound in accordance with claim 5 wherein said compound is p-[(3,7,11-trimethyl-dodeca-2,6,10-trienyl)-oxy]-benzoic acid methyl ester.

19. A compound in accordance with claim 5 wherein said compound is p-[3,7,11-trimethyl-dodeca-2,6,10-trienyl)oxy]-benzoic acid.

20. A compound of claim 2, wherein said compound is p-[(1,5-dimethyl-hept-4-enyl)-oxy]-benzoic acid methyl ester.

References Cited
FOREIGN PATENTS
883,234   11/1961   England _____ 280—473 R

LORRAINE A. WEINBERGER, Primary Examiner

J. F. TERAPANE, Assistant Examiner

U.S. Cl. X.R.

260—240, 327 E, 348 A, 468 K, 470, 514 K, 516, 521 R, 521 A; 424—275, 278, 305, 308, 317

UNITED STATES PATENT OFFICE
CERTIFICATE OF CORRECTION

Patent No. 3,833,642              Dated  September 3, 1974

Inventor(s) Madhukar Subraya Chodnekar et al.

It is certified that error appears in the above-identified patent and that said Letters Patent are hereby corrected as shown below:

Claim 1, col. 10, line 46, "O;"

should be

O.

Column 11, line 24,

"is p-[(2-ethyl-5-methyl-hex-4-enyl)-oxy]-benzoic acid"

should be omitted.

Column 11, line 25,

"is p-[(2-ethyl-5-methyl-hex-4-enyl)-oxy]-benzoic acid methyl ester"

should be

Claim 13. The compound of claim 12 wherein said compound is p-[(2-ethyl-5-methyl-hex-4-enyl)-oxy]-benzoic acid methyl ester.

UNITED STATES PATENT OFFICE
CERTIFICATE OF CORRECTION

Patent No. 3,833,642      Dated September 3, 1974

PAGE - 2

Inventor(s) Madhukar Subraya Chodnekar et al.

It is certified that error appears in the above-identified patent and that said Letters Patent are hereby corrected as shown below:

Claim 1, col. 10, line 46, "O;"

should be

O.

Column 11, line 24,

"is p-[(2-ethyl-5-methyl-hex-4-enyl)-oxy]-benzoic acid"

should be omitted.

Column 11, line 25,

"is p-[(2-ethyl-5-methyl-hex-4-enyl)-oxy]-benzoic acid methyl ester"

should be

Claim 13. The compound of claim 12 wherein said compound is p-[(2-ethyl-5-methyl-hex-4-enyl)-oxy]-benzoic acid methyl ester.

Signed and sealed this 31st day of December 1974.

(SEAL)
Attest:

McCOY M. GIBSON JR.      C. MARSHALL DANN
Attesting Officer         Commissioner of Patents